June 9, 1964 J. C. KAY 3,136,852

TELEPHONE AMPLIFIER

Filed Oct. 15, 1958

2 Sheets-Sheet 1

INVENTOR.
JAMES C. KAY
BY George H. Baldwin
ATTORNEY

June 9, 1964 | J. C. KAY | 3,136,852

TELEPHONE AMPLIFIER

Filed Oct. 15, 1958

2 Sheets-Sheet 2

INVENTOR.
JAMES C. KAY

BY George H. Baldwin
ATTORNEY 3,136,852
Patented June 9, 1964

3,136,852

TELEPHONE AMPLIFIER

James C. Kay, 1511 Dean Ave., Rome, Ga.

Filed Oct. 15, 1958, Ser. No. 767,328
7 Claims. (Cl. 179—1)

This invention pertains to telephone amplifiers, and particularly to apparatus for holding a telephone handset and for amplifying the signals received thereby.

An object of the invention is to provide an improved inexpensive telephone handset amplifier more conveniently usable, entirely self-contained and attractive in appearance.

A specific object of the invention is to provide an amplifier device usable with an increased range of types of telephone handsets, having, for example, receivers of various magnetic, dynamic or other types.

Another object of the invention is to improve the acoustic qualities of handset amplifiers.

A further object is to provide, in a compact and simple handset holding and amplifying device, improved means for minimizing undesired feedback from the amplifier output loudspeaker to the transmitter or microphone of the handset.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
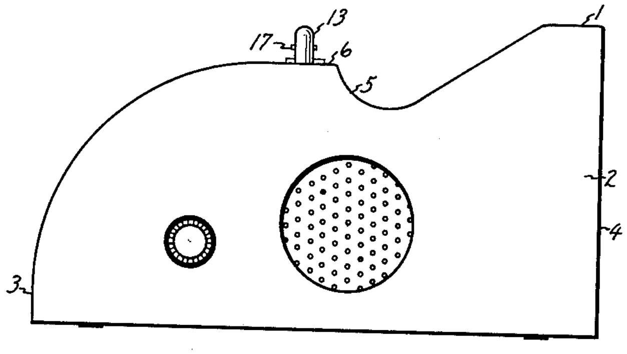
FIG. 1 is a front elevation.
Figure 2:
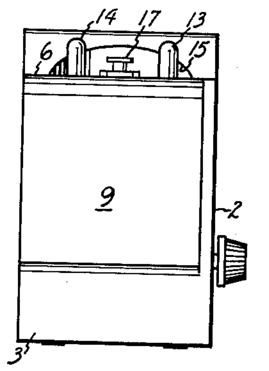
FIG. 2 is an end elevation of an amplifier device in accord with the invention.
Figure 3:
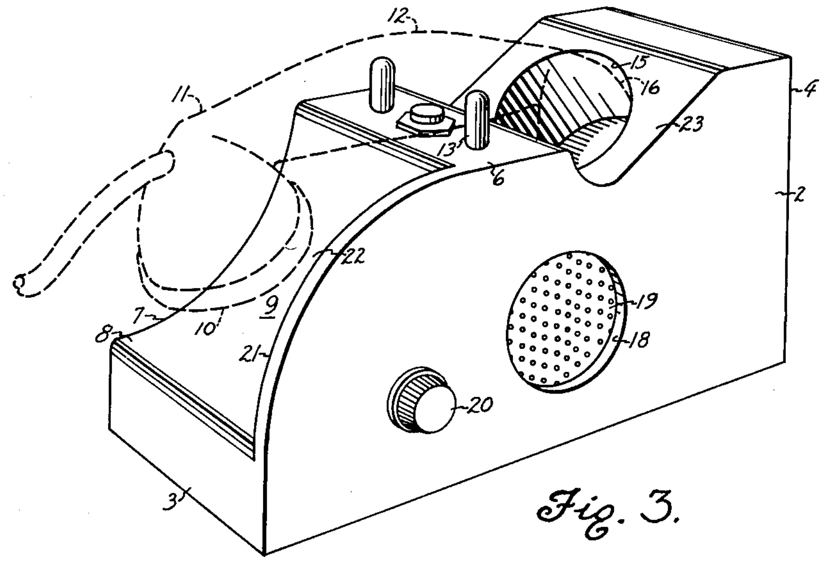
FIG. 3 is a perspective view of the device, a telephone handset as used in connection with the device being indicated by broken lines.

As shown in FIGS. 1, 2 and 3, the amplifier device comprises an elongated cabinet 1 having a front wall 2, end walls 3 and 4, and a top 5 which includes a raised deck portion 6 located intermediate the ends of the cabinet. The top, between deck 6 and end 3 of the cabinet, comprises a generally cylindrically concave portion 7 extending curvedly downwardly from the deck 6 toward and meeting the end 3 in a generally horizontal part 8 of portion 7. The concave portion 7, and particularly its intermediate part generally indicated at 9, serve to reflect and concentrate sound waves striking the concave portion toward the transmitter 10 of a telephone handset, indicated by broken lines 11, placed in proper position with its handle portion 12 resting on deck 6. A pair of posts 13 and 14 extend upwardly from the deck as an aid in positioning the handset and to retain it in proper position. A hollow cylindrical casing and positioning socket 15 is provided between deck 6 and end 4 opening through top 5 and adapted and arranged loosely to receive the receiver portion 16 of the handset.

A depressible switch button 17 extends upwardly midway between posts 13 and 14 and forms a slightly raised portion of deck 6. It is on this switch button portion of the deck that at least a major portion of the weight of the handset is imposed when the device is in use. The posts 13 and 14 are spaced sufficiently close to each other to prevent the handset from rocking off of button 17 and to cooperate with socket 15 so to retain the handset in alignment on the cabinet that the transmitter is properly located opposite and spaced from portion 9 of the concave sound reflector 7.

The front wall or panel 2 is provided, approximately centrally thereof, with a speaker opening 18, covered with a suitable sound-passing grille 19. A gain control knob 20 is disposed adjacent speaker opening 18. The front panel further includes an extending portion 21 which shields the handset transmitter 10 in a manner to reduce at the transmitter the intensity of sound waves which have issued through grille 19. Portion 21 defines with concave top wall portion 7 an open shielding cavity, generally indicated at 22, in which the transmitter is disposed and which is so directed and shaped as to discriminate against sound waves from the speaker opening in favor of sound waves approaching the cabinet from other directions.

It will be seen from FIGS. 1–3 that the handset is easily placeable on the cabinet in proper position by bringing the receiver toward the upwardly inclined top wall portion 23 which is located between deck 6 and end 4, and by then introducing the receiver into the receiver cavity 15, thereafter lowering the handle and transmitter portions until the handle rests on button 17 between posts 13 and 14. Button 17 is shown in FIG. 3 as being depressed by the handset weight.

Figure 4:
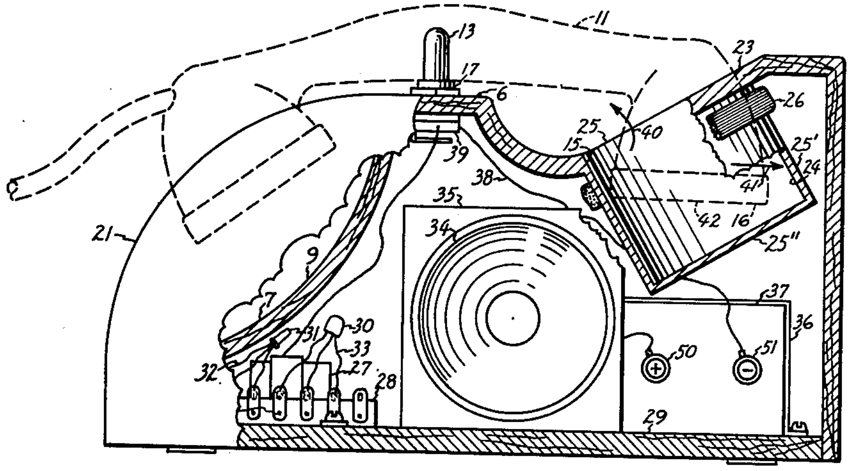
FIG. 4 is a front elevation of the device with portions of the cabinet broken away showing the internal arrangement, and with a handset indicated in broken lines as in FIG. 3 as exemplary of the intended use of the device.

The relationship of the several parts of the cabinet may be further understood with reference to FIG. 4, wherein it will be seen that socket 15 provides a cylindrical cavity 24 having an opening 25, through top wall portion 23, which lies in a plane inclined at substantially 30 degrees to the horizontal, and, accordingly, with the cavity 24 extending downwardly at an angle of substantially 60 degrees to the horizontal. The cabinet walls are of non-metallic, rigid material, such as wood or a plastics material, and the socket 15 is formed to have a thin cylindrical wall 25' and a bottom wall 25''. Closely surrounding the wall 25' exteriorly of the socket 15 is a coil 26 comprising several hundred turns, such as 600 turns, of wire, for example, #32 insulated copper magnet wire. It will be seen that the axis of the coil 26 is at an angle of approximately 30 degrees to the axis of the receiver 16 of the handset, or, in other words, that there is an angle of 30 degrees between the planes of the coil and receiver. The button 17 is depressed by the weight of the handset, represented by broken lines 11, when the handset is positioned to dispose its receiver within cylindrical cavity 24 and its transmitter adjacently opposite the intermediate portion 9 of the concave sound reflecting and concentrating wall portion 7 and behind the sound shielding extension 21 of the front wall.

Coil 26 is connected to the input circuit of an amplifier which includes a transformer 27 and terminal strip 28 each supportingly connected to the bottom closure panel 29 of the cabinet, and further comprising suitable circuit elements including transistors 30 and 31 supportingly connected through suitable wire leads 32, 33 to the terminal strips. The amplifier comprises other elements, as further explained below, mounted generally in the manner suggested by the disclosure of FIG. 4 but omitted from FIG. 4 for the sake of clarity.

Speaker 34 is mounted by means of a suitable bracket 35 to base 29, while a bracket or clamp 36 mounts 9 volt dry cell battery 37 to the base. Battery 37 is connected to the amplifier by conductor means including negative terminal ground lead 38 in which normally open switch 39 is interposed, the switch 39 being closed in response to depression of button 17 by the handset to energize the amplifier.

It has been found that the magnetic field induced by voice currents flowing in the receiver of the handset may be generally vertical, as indicated approximately by arrow 40, or approximately horizontal, as indicated by arrow 41. The orientation of coil 26, however, being at substantially 30 degrees to the plane of the ear-contacting surface, generally indicated at 42, of the receiver 16, provides an induced voltage in the coil of the same order of intensity regardless of variations of the field direction which may result from using the device with handsets of widely varying design having substantially any possible field pattern.

Figure 5:
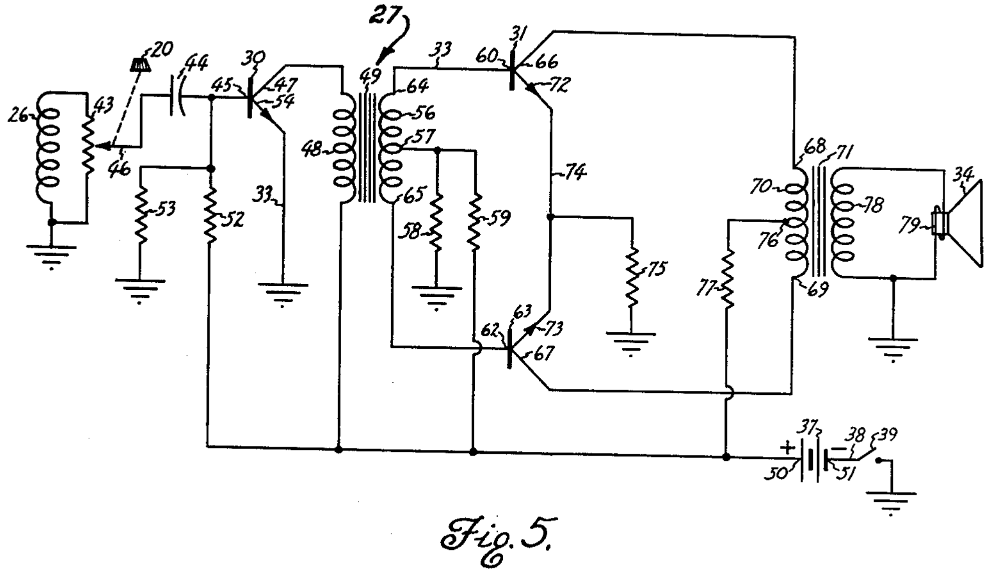
FIG. 5 is a schematic diagram of the electronic circuit of the amplifier.

The amplifier embodied in the device comprises, as shown in FIG. 5, a volume control potentiometer 43 of about 10,000 ohms resistance connected across pickup coil 26, and operated by control knob 20. The potentiometer slider 46 is connected through condenser 44, of 10 mfd. capacity, for example, to the base 45 of amplifying transistor 30. Transistor 30 may be of type 2N213. Collector 47 of transistor 30 is connected through primary winding 48 of coupling transformer 27, having core 49, to the positive terminal 50 of power supply battery 37, the negative terminal 51 being grounded through conductor 38 upon closure of switch 39. A voltage divider network consisting of resistors 52 and 53 connected in series between terminal 50 and ground provides base bias for the transistor, resistor 52 connected between the base and the positive terminal 50 being appropriately of about 27,000 ohms and the ground-connected resistor 53 being of 680 ohms. The emitter 54 is grounded directly through conductor 33. Secondary winding 56 of transformer 49 has a center tap 57 connected through resistor 58, of about 200 ohms, to ground and through resistor 59, of about 3,000 ohms, to the positive battery terminal 50, thus to provide base bias voltages for the base 60 of transistor 31 and the base 62 of transistor 63. The signals from the secondary winding 56 are supplied from ends 64 and 65 thereof, through conductors such as conductor 33, to the bases 60 and 62 of transistors 31 and 63, respectively, in push-pull, and the respective collectors 66 and 67 of these transistors are respectively connected to ends 68 and 69 of primary winding 70 of output transformer 71. The transistors 31 and 63 may be of type 2N214 and, with their respective emitters 72 and 73 interconnected by conductor 32 and through a common resistor 75 of about 5 ohms to ground, these transistors operate as class A, or class AB, push-pull amplifiers. Winding 70 is provided with a center tap 76 connected through a resistor 77 of about 100 ohms to the positive battery terminal to provide collector voltages to transistors 31 and 63. Secondary winding 78 of the output transformer feeds the voice coil 79 of speaker 34.

The amplifying device with no handset positioned thereon is completely de-energized, switch 39 being open and battery 37 being, therefore, disconnected from the circuit. When a handset is placed in proper position, as shown in broken lines at 11 in FIGS. 3 and 4, switch 39 is closed, and the amplifier immediately becomes operative to amplify voltages induced in coil 26. The device, being battery operated, is readily portable. When the telephone rings, the handset is removed from its stand and placed in position on the device, whereupon, without any delay for warm-up, the amplifier becomes immediately operative to permit conversation back and forth over the telephone instrument with no necessity of having previously supplied power to any part of the amplifier to maintain it in condition for the immediate operation which is essential to practical utility.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A telephone handset amplifier device comprising an elongated cabinet with a front wall and a top each extending from end to end of the cabinet, said top having a raised deck portion intermediate its ends, a concave depressed portion extending generally downwardly and toward one said end of said cabinet from said deck portion and a cylindrical cavity spaced between said deck portion and the other end of the cabinet, said deck portion establishing a plane of rest for the handle portion of a telephone handset, said cylindrical cavity extending downwardly and away from said deck at an angle of approximately 30 degrees with respect to said plane and having an opening through said top wall inclined upwardly toward said other end and with its center substantially aligned in said plane, said cavity and opening being proportioned and arranged to receive the earphone portion of a telephone handset loosely therewithin, a pick up coil inside said cabinet surrounding said cylindrical cavity and disposed adjacent said opening and parallel thereto, a transistor amplifier in said cabinet, a battery in said cabinet for energizing said transistor amplifier, a normally open switch connected between said battery and amplifier, said switch having a spring-loaded operating member exposed on said deck operable to close said switch and thereby to energize said transistor amplifier in response to the resting on said deck of the handle of a telephone handset, a loudspeaker in said cabinet opening through said front wall approximately centrally thereof and below said deck, said front wall extending shieldingly across and in front of said depressed portion, thereby to reduce feedback from said loudspeaker into the transmitter of a handset so placed as to dispose its transmitter in said depressed portion, its earphone in said cavity and its handle restingly on said deck.

2. A telephone handset amplifier device comprising a cabinet including a top and a front wall panel, said top having a raised generally central platform portion adapted to be engaged by the handle portion of a handset and to support the handset thereon in generally horizontal position, said top further having an opening therein located between said platform portion and one end of said top and adapted, proportioned and arranged to receive the handset receiver portion loosely therethrough, a hollow pickup coil disposed adjacently below said opening at an angle of substantially 30 degrees to the horizontal and with its opening substantially aligned with said opening whereby to surround said receiver at an angle of substantially 30 degrees to the ear-engageable face thereof, said top having an open cavity therein between said platform portion and the other end of said top and adapted and arranged to receive the handset transmitter thereinto, said front wall panel extending shieldingly across the front of said cavity, a loudspeaker opening through said front panel and disposed under said platform and spaced from said cavity, a transistor amplifier in said cabinet having an input connected to said coil and an output connected to said loudspeaker, a battery in said cabinet, a normally open switch having an actuating element exposed on said platform engageable by the handset handle to close said switch, and means connecting said battery to said amplifier through said switch.

3. A two way telephone amplifier comprising a casing having a substantially horizontal top wall constituting a cradle for a telephone hand set with a well in its rear portion adapted to receive a receiver component of a telephone hand set and having a concave front wall extending from side to side of the casing and sloping rearwardly from the bottom front edge to the top of the casing and shaped to reflect and condense sound waves impinging upon it, the top wall having a longitudinally extending portion connecting the well and the top of the front wall and adapted to receive the body portion of a telephone hand set therealong in a position with the receiver component in the well and the mouth piece overhanging the front wall in position to receive the said reflected and condensed sound waves, an amplifier circuit in the casing having a make and break switch and an induction coil disposed in magnetic coupling proximity to the bottom of the well, an aperture in said portion of said top wall, and a normally elevated switch button in the aperture in operative attachment to said make and break switch and adapted to be depressed by the telephone hand set and close the circuit when the hand set is in said position on said portion of said top wall.

4. A two way telephone amplifier as defined in claim 3 in which the horizontal component of slope of the concave front wall is such that the wall completely underlies the mouth piece of a telephone hand set in said position.

5. A two way telephone amplifier comprising a casing having a substantially horizontal top wall constituting a cradle for a telephone hand set with a well in its rear portion adapted to receive a receiver component of a telephone hand set and having a concave front wall extending from substantially side to side of the casing and sloping rearwardly from the bottom front edge to the top of the casing and shaped to reflect and condense sound waves impinging upon it, laterally spaced upwardly projecting positioning means on said top wall, said top wall having a portion extending longitudinally between said positioning means connecting the well and the top of the front wall, said positioning means being adapted to receive therebetween and along said top wall portion the body portion of a telephone hand set with the receiver component in the well and the mouthpiece overhanging the front wall in position to receive the said reflected and condensed sound waves, an amplifier circuit in the casing having a make and break switch and an induction coil disposed in magnetic coupling proximity to the bottom of the well, an aperture in said portion of said top wall, and a normally elevated switch button in the aperture in operative attachment to said make and break switch and adapted to be depressed by the telephone hand set and close the circuit when the hand set is on the cradle.

6. A two way telephone amplifier as defined in claim 5 in which the horizontal component of slope of the concave front wall is such that the wall completely underlies the mouth piece of a telephone hand set on the cradle.

7. A two way telephone amplifier as defined in claim 5 wherein a sound shielding panel is provided extending generally upwardly and forwardly from one edge of said front wall at one side thereof to attenuate sound waves directed toward said front wall from said one side.

References Cited in the file of this patent

UNITED STATES PATENTS

| | | |
|---|---|---|
| 2,402,341 | Patterson | June 18, 1946 |
| 2,657,265 | Branson et al. | Oct. 27, 1953 |
| 2,805,284 | Flury | Sept. 3, 1957 |
| 2,816,179 | Gittleman et al. | Dec. 10, 1957 |
| 2,831,923 | Block | Apr. 22, 1958 |
| 2,839,620 | Waldhauer | June 17, 1958 |
| 2,952,739 | Lehman | Sept. 13, 1960 |

FOREIGN PATENTS

| | | |
|---|---|---|
| 996,905 | France | Dec. 28, 1951 |